United States Patent [19]
Bray

[11] Patent Number: 5,487,061
[45] Date of Patent: Jan. 23, 1996

[54] SYSTEM AND METHOD FOR PROVIDING MULTIPLE LOSS AND SERVICE PRIORITIES

[75] Inventor: Thomas A. Bray, Sarasota, Fla.

[73] Assignee: Loral Fairchild Corporation, Syosset, N.Y.

[21] Appl. No.: 265,969

[22] Filed: Jun. 27, 1994

[51] Int. Cl.⁶ ........................................ H04J 3/14
[52] U.S. Cl. .................. 370/13; 370/13; 370/85.6; 370/110.1; 370/94.1; 371/3; 371/37.7
[58] Field of Search ................ 370/17, 94.1, 85.6, 370/13, 110.1; 371/37.7, 3

[56] References Cited

U.S. PATENT DOCUMENTS

| | | | |
|---|---|---|---|
| 5,062,106 | 3/1990 | Yamazaki et al. | 370/85.6 |
| 5,185,741 | 2/1993 | Iguchi et al. | 370/94.1 |
| 5,210,744 | 5/1993 | Yamanaka et al. | 370/60 |
| 5,226,147 | 7/1993 | Fujishima et al. | 395/425 |
| 5,230,002 | 7/1993 | Yamashita et al. | 371/37.7 |
| 5,231,633 | 7/1993 | Hluchyj et al. | 370/94.1 |
| 5,267,232 | 11/1993 | Katsube et al. | 370/17 |
| 5,268,900 | 12/1993 | Hluchyj et al. | 370/94.1 |
| 5,293,346 | 3/1994 | Nakajima et al. | 365/221 |
| 5,301,296 | 4/1994 | Mohri et al. | 395/425 |
| 5,335,224 | 8/1994 | Cole et al. | 370/94.1 |
| 5,390,176 | 2/1995 | Schoute et al. | 370/60.1 |

OTHER PUBLICATIONS

Chang et al., "The Effect of Prioritization on the Behavior of a Concentrator Under an Accept, Otherwise Reject Strategy," *IEEE Transactions on Communications*, vol. 38, No. 7, pp. 1031–1039, Jul. 1990.

Primary Examiner—Douglas W. Olms
Assistant Examiner—Seema S. Rao
Attorney, Agent, or Firm—Sterne, Kessler Goldstein & Fox

[57] ABSTRACT

A system and method for implementing quality of service features in a packet switch calculates quality of service parameters, and inserts these parameters into the packet header before the packet reaches the switch fabric itself. When a packet is received, errorcode processing takes place and the no longer needed error code is discarded. Packet header information is used to determine, via lookup table or other means, the service class and loss priority to be assigned to the packet. These parameters are inserted in the errorcode field of the packet header before the packet is provided to the switch fabric itself.

21 Claims, 12 Drawing Sheets

SYSTEM AND METHOD FOR PROVIDING MULTIPLE LOSS AND SERVICE PRIORITIES

RELATED APPLICATION

This application is related to two commonly owned applications filed on even date herewith, the full disclosures of which are incorporated herein by reference as if reproduced in full below. These applications are titled "Packet Processor Having Service Priority and Loss Priority Features" and "System and Method for Generating a Linked List in a Computer Memory" Ser. No. 08/265,968, and Ser. No. 08/265,965, respectively.

BACKGROUND OF THE INVENTION

1. Field of the Invention

The present invention relates generally to packet processing, and more specifically, to a system and method for assigning multiple loss and service priorities to data packets.

2. Related Art

Computer networks such as LANs (local area networks) and WANs (wide area networks) have become commonplace in contemporary business and industry. Such networks allow communications between computers at various locations. For example, computer networks are used to allow communications among several computers in an office, within a city, or even across several continents.

To most efficiently accommodate the dynamics of computer communications traffic, networks are implemented using packet switching technology. In a packet switched network, data are encapsulated into a packet at the source node and the packet is transmitted across the network to the destination node. Because a packet switched network does not have dedicated physical channels, packet communications provides the efficiency of shared bandwidth.

The application of packet communications is not limited to sharing of computer data among computers. For example, one network, the broadband integrated services digital network (BISDN), has evolved to allow packet communications techniques to provide voice video teleconferencing over a packet switched network.

Packet switching is an ideal way to optimize the use of available bandwidth of a communications network. However, when traffic grows to high levels, network congestion can occur. When such congestion occurs data are delayed and some packets can even be lost, never reaching their intended destination.

SUMMARY OF THE INVENTION

The present invention is directed toward a system and method for optimizing the handling of packetized data in a communications switch. According to the invention, users can specify a service class that dictates the type of treatment their packet data will receive. The parameters that are used to specify a particular service class can include a service priority (i.e., service priority) and a loss priority. Thus, for example, when a user specifies a service class, the user can specify a particular service priority and/or a particular loss priority.

The service priority dictates the relative amount of delay introduced by the packet switch. The loss priority dictates the relative likelihood that a packet will be lost or discarded when congestion occurs. According to the invention, when a user has a high service priority, that user's data is generally routed out of the packet switch sooner than data of a user who specified a lower service priority. When a user has a low loss priority and the network becomes congested, that user's data is generally discarded before the data of a user with a higher loss priority.

Thus, one advantage of the invention is that it allows users to specify the type of treatment that is most beneficial to their needs. A user who has real-time video transmission requirements may specify a high service priority while a user with strict data loss requirements may specify a high loss priority. The cost and performance of the packet switch can be tailored to suit diverse needs of multiple users. Because relative priorities can be assigned, the packet loss and packet delay can be optimized for each user.

Implementation of the "service class" feature for packet switching is ideally accomplished before the packet reaches the switch fabric itself. Thus, in one embodiment, the service class parameters are provided to the packet before it reaches the switch fabric. In this embodiment, after the error code of the packet is checked, it is discarded. This frees the error-code field in the packet header for the service class information to be stored. Therefore, service priority and loss priority parameters for the packet are determined in the initial stages of packet processing and inserted into the temporarily unneeded error-code field before the packet is sent to the switch fabric.

One advantage of using the field reserved for the data packet header's error code is that this allows transfer of the service class data with the data packet at no additional expense of increased bandwidth or increased data.

A further advantage is that the service class values are present with the data packet and do not need to be calculated at the exodus from the switch fabric. As a result, egress processing at the switch fabric rate is minimized.

Still a further advantage of the invention is that because the class of service values are present with the data packet and do not need to be calculated, more time is available during egress processing and thus, a more complex and effective congestion management algorithm can be implemented.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Figure 1:
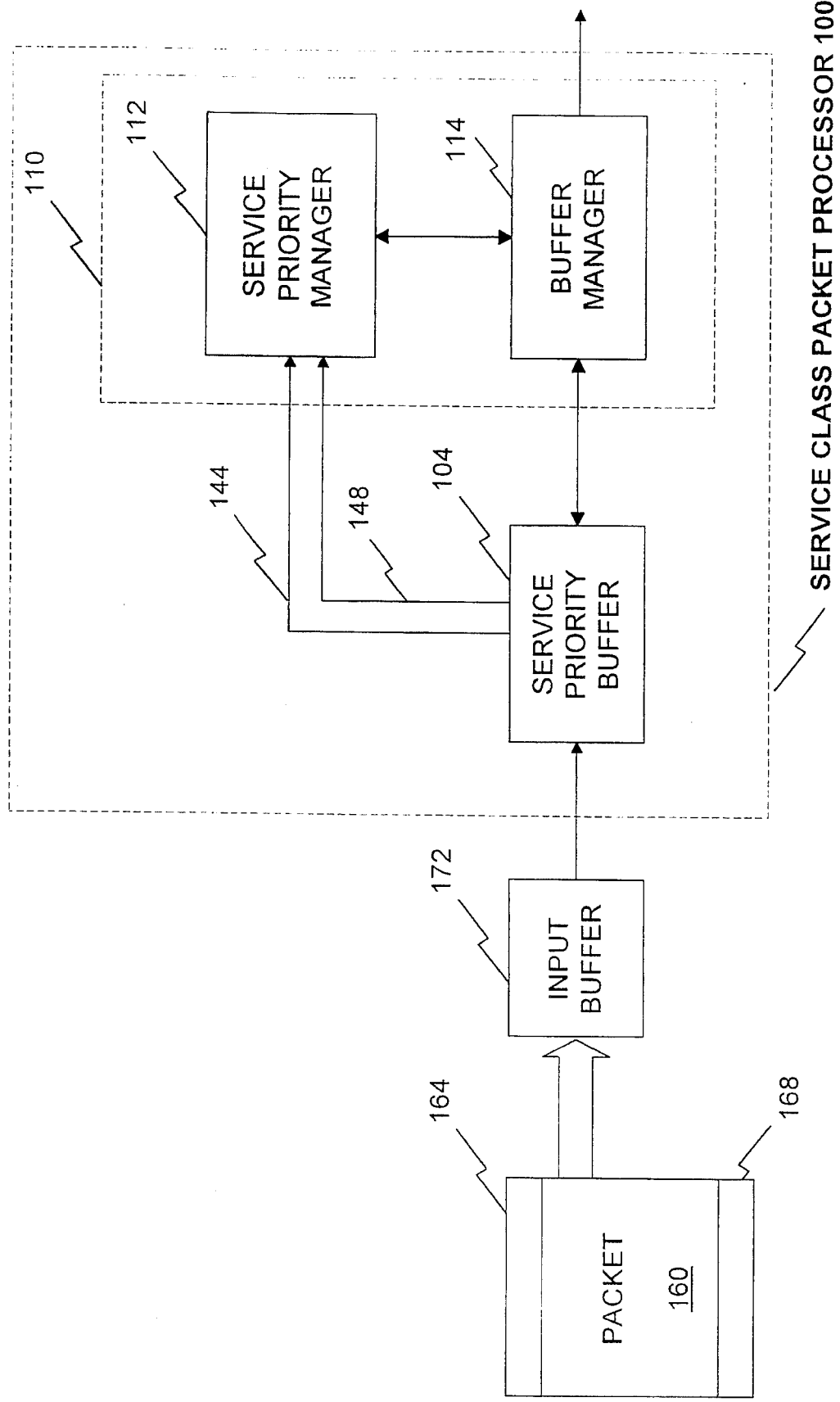
FIG. 1 is a block diagram illustrating a representative functional architecture of a service priority packet processor.

1. Overview and Introduction of the Invention

The present invention is directed toward a packet processor, or packet switch, capable of managing and switching data packets for a packetized communications network. The packet switch can handle several different types of network traffic, such as ATM (Asynchronous Transfer Mode) packet data and frame relay data.

According to ATM standards, a user's data is partitioned into segments, called cells, for transmission over the network. The cell size is 53 octets, five of which are used by the network for routing and error control. The segmentation of data into cells, or packets, introduces tremendous flexibility for handling different types of information over a single network. In this patent document, the word "packet" is used to generally refer to data packaged into a packet, a cell, or other like segmented data package.

With contemporary communications networks, typically a large communications bandwidth is required. For example, with a network such as the Information Superhighway, one goal is to provide a broadband stream of information to each subscriber in his or her home or office. Each of these users, however, may have different communications requirements. A business user, for example, may require video conferencing or video telephone capabilities. In another example, a different business user may require the ability to download production information from a manufacturing plant to the main office to update business records. Still another user may want the ability to request and receive television programming on demand.

In communications networks, there are two primary characteristics (among others) that affect user services: latency and packet loss. Latency is the amount of delay introduced in transporting packet data from a source node to a destination node. Packet loss is the number of data packets lost due to buffer resources or bandwidth being exceeded. Each of the network users has differing requirements for latency and packet loss. A few examples of these differing requirements are now described.

For a user requiring video teleconferencing capabilities, latency is the most important factor. For the network to support high quality video teleconferencing it must be able to support real-time transmission of television-quality video across the network. In this application, it is important that the data packets be transmitted across the network with a minimum of delay and, therefore, a minimum amount of buffering. If delays introduced in the transmission are excessive, an unwanted amount of delay is provided between the parties. Additionally, if non-uniform delays are introduced in transmission, without sufficient buffering at the receiving end, the video may appear jittery. However, too much buffering can result in unwanted delays. Packet loss is not as critical a factor in video teleconferencing. Small amounts of data lost in a video link usually go undetected by the human eye.

In the example of the business user downloading production data to a host computer, latency across the network is not as serious a problem as packet loss. In this example, gaps or pauses in the transmission stream do not affect the users. Often times, data are transported after the close of business and the computers are updated after normal business hours. Thus, a certain amount of delay is acceptable. What is critical to the user in this case is that all of the data be transported with as few errors as possible. If the data contains an undue amount of errors, or if data is lost, the host computers can not be accurately updated.

The packet processor of the present invention allows packet data to be handled differently for different users. According to the present invention, each user designates a "service class" that he or she expects to receive. Such a service class can include a service priority and a loss priority designation. The service priority designates the amount of latency acceptable to a user while the loss priority designates the amount of loss acceptable. Thus, a user with a high service priority expects a minimum amount of delay in transmission and a user with a high loss priority expects a minimum amount of packet loss. Each user can be set up with his or her own service class (i.e., a specified service priority specified loss priority designation). Additionally, each user can have a different service class designated for different network services.

It is not necessary that the packet processor provide both service priority and loss priority features. A packet processor can be implemented offering only one or the other feature depending on the application requirements.

2. Example Implementation

The packet processor according to the present invention is now described. The packet processor is described in two parts. In the first part, Section 2.1, the packet processor is described as a service priority processor providing management of packets based on the service priority of each packet. In the second part, Section 2.2, the packet processor is described as a service priority processor having an additional stage for processing packets based on loss priority. This multistage packet processor first examines the loss priority of a packet to determine whether that packet will be admitted to the buffer or discarded. If the packet is admitted to the buffer, the multistage packet processor then manages the packets based on their service priority to determine the order in which packets are processed out of the buffer.

2.1 Service Priority Processing

A packet processor offering service priority processing is now described. FIG. 1 is a block diagram illustrating a representative functional architecture of a service priority packet processor. Referring now to FIG. 1, a service priority packet processor 100 includes a service priority buffer 104 and a packet manager 110. In this representative architecture, packet manager 110 includes a service priority manager 112 and a buffer manager 114.

External to service priority packet processor 100 is an input buffer 172 to receive packetized data 160 (hereafter packet 160). Packet 160 can include a packet header 164 and a packet trailer 168 which can be used for packet and traffic management functions such as source, destination, and routing information; error checking; and other like packet features.

In operation, packets 160 are received by input buffer 172. Input buffer 172 performs rate equalization and other buffering functions for the incoming packet stream. It should be noted that input buffer 172 is not essential to the functioning of service priority packet processor 100. However, input buffer 172 provides desirable functionality.

Packets 160 are read out of input buffer 172 and forwarded to service priority packet processor 100. Service priority packet processor 100 stores these incoming packets 160 into service priority buffer 104. Packet manager 110 determines the order in which packets 160 are read out of service priority buffer 104.

Figure 3:
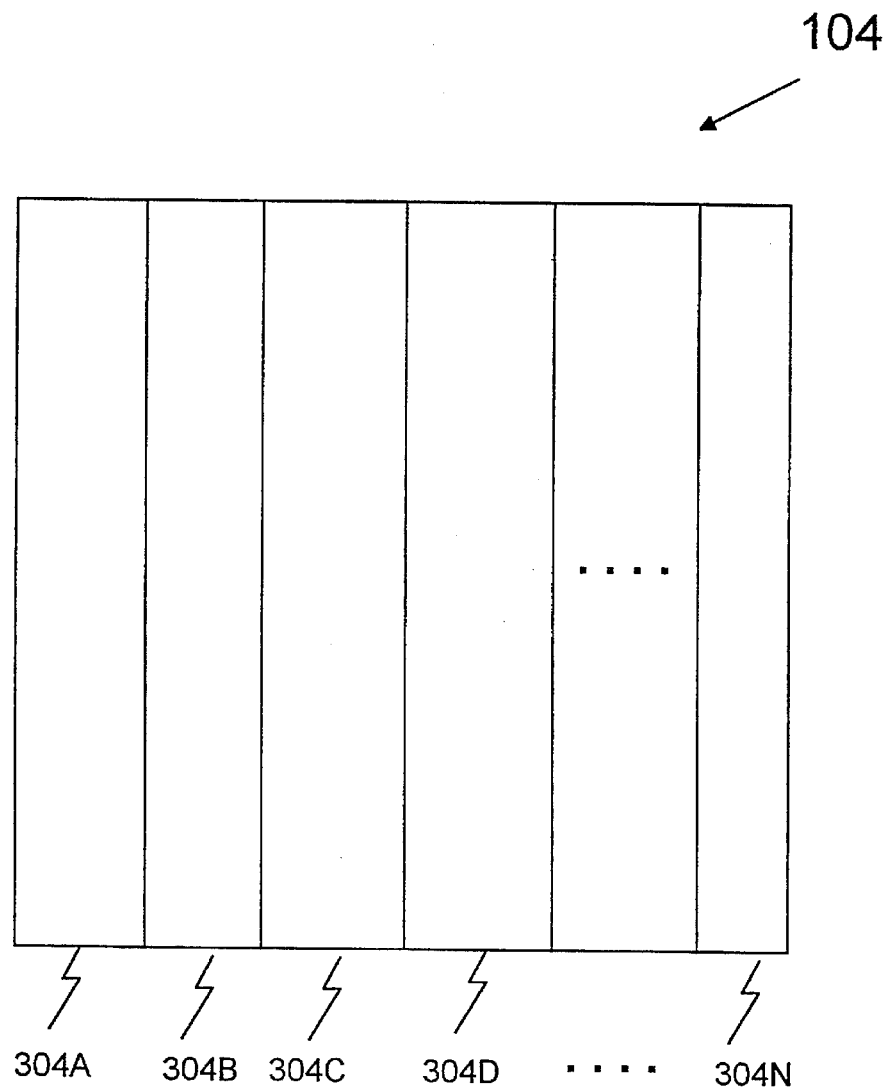
FIG. 3 illustrates one way in which service priority buffer can be divided into multiple service priority buffers.

To accomplish the management of packets based on service priorities, service priority buffer 104 is divided (virtually or physically) into several smaller buffers, one buffer for each service priority. In a preferred embodiment, this division is a virtual division as opposed to a physical division. Thus, each service priority division in the buffer can be described as a service priority virtual FIFO. This concept is illustrated in FIG. 3. FIG. 3 illustrates one way in which service priority buffer 104 can be divided into multiple service priority buffers. As stated above, the preferred division is virtual rather than a physical. As such, the ensuing discussion will speak to these individual service priority FIFOs as virtual service priority FIFOs. It would be apparent to persons skilled in the relevant art how this concept is implemented using physical partitioning.

Referring now to FIG. 3, service priority buffer 104 is divided into N virtual FIFOs 304A–304N. Each virtual class FIFO 304 can be designated as having a unique size, different from the other virtual FIFOs 304. The length of each virtual FIFO 304 is dynamically set based on the anticipated amount of traffic in each service priority. The relative importance of each service priority (i.e., the priority inherent therein) can also be a factor in determining the length of each virtual FIFO.

A more detailed method of one way in which service priority buffer 104 can be divided into multiple queues (or lists) is provided in the copending patent application entitled "System and Method for Generating a Linked List in a Computer Memory." This copending patent application of common assignee, having Attorney Docket Number 0701.0440000, and filed on even date herewith, is hereby incorporated by reference herein in its entirety.

To determine the order in which to read packets 160 out of service priority buffer 104, packet manager 110 utilizes a buffer manager 114 and a service priority manager 112. Service priority manager 112 obtains information from service priority buffer 104 regarding the status of the buffer 104. This information can include service priority fullness 144 and total buffer fullness 148. Service priority fullness 144 indicates the fullness of each service priority virtual FIFO 304. Total buffer fullness 148 indicates the fullness of service priority buffer 104 without regard to the fullness of each individual service priority virtual FIFO 304.

Figure 2:
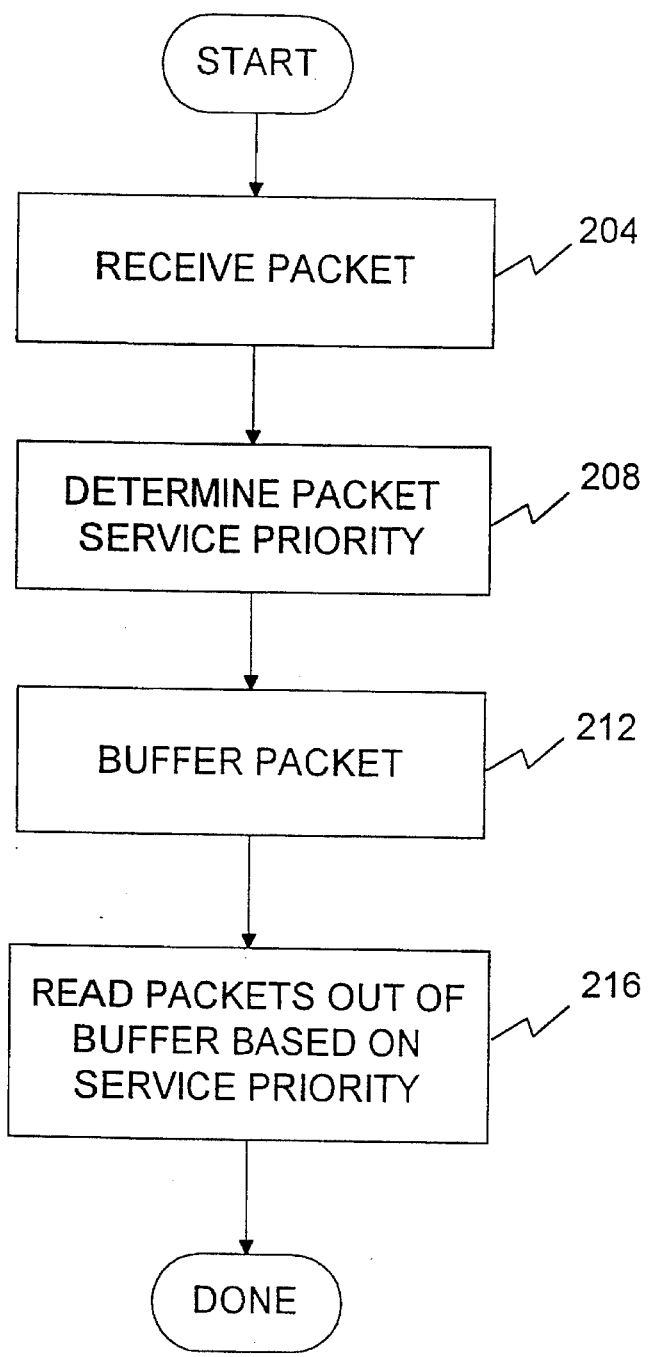
FIG. 2 is a high-level operational flow diagram illustrating the manner in which a service priority packet processor processes packets according to their service priority.

The operation of prioritizing the reading of packets 160 according to service priorities is now described in greater detail. FIG. 2 is a high-level operational flow diagram illustrating the manner in which a service class packet processor 100 processes packets according to their service priority. Referring now to FIGS. 1, 2, and 3, in a step 204, service class packet processor 100 receives a packet 160 from input buffer 172. Upon receipt of packet 160, service class packet processor 100 in step 208 determines the service priority of the received packet 160. In one embodiment, the service priority of the data packet 160 is encoded into the packet header. In this embodiment, service class packet processor 100 determines the service priority by reading this header field.

In a step 212, the packet 160 is buffered in service priority packet processor 100. According to the functional architecture depicted in FIG. 1, the packets 160 are buffered in service priority buffer 104. As described above, packet 160 is stored in the virtual FIFO 304 corresponding to its service priority.

In a step 216, packet manager 110 reads packets 160 out of service priority buffer 104 based on the service priority. In this manner, packets having a higher service priority can be treated on a higher priority basis than packets having a lower service priority.

Figure 4:
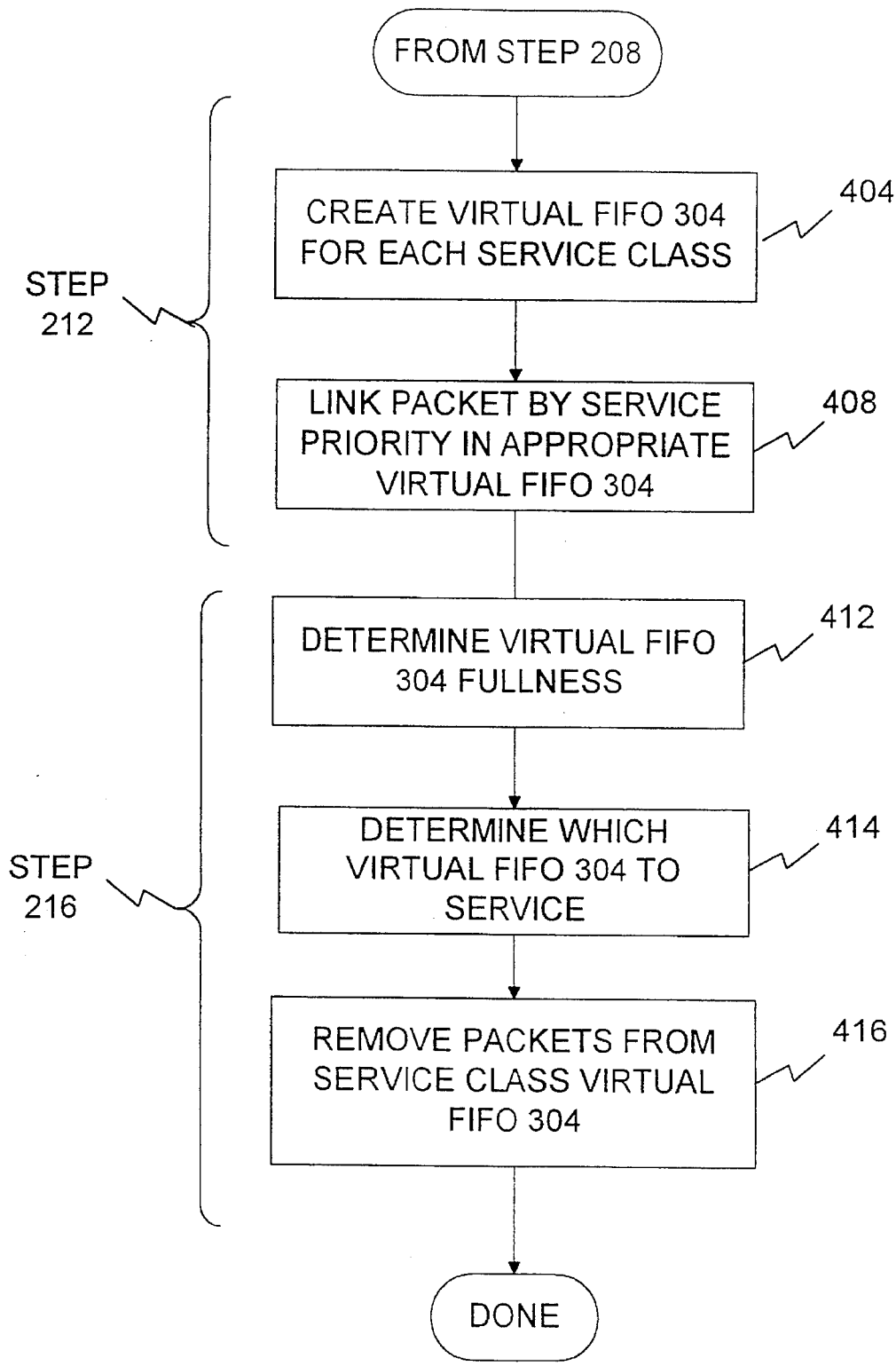
FIG. 4 is an operational flow diagram illustrating steps 212 and 216 of FIG. 2 in greater detail.

Two important features of service priority packet processor 100 are the manner in which packets are buffered in service priority buffer 104, and the manner in which packets are read out of service priority buffer 104. To clarify the way that these steps are accomplished, they are further described with reference to FIG. 4. FIG. 4 is an operational flow diagram illustrating steps 212 and 216 of FIG. 2 in greater detail.

Referring now to FIGS. 1 and 4, in a step 404, a virtual FIFO 304 is created for each service priority. Step 404 can be performed in advance prior to receipt of packets 160. Where service priority packet processor 100 is implemented in an application having a defined set of service priorities, service priority buffer 104 can be partitioned into virtual FIFOs 304, one for each service priority. Alternatively, service priority buffer 104 could be partitioned in virtual FIFOs 304A–304N as packets 160 are received. In this latter scenario, a new virtual FIFO 304 could be created each time a packet 160 having a new service priority is received.

In a step 408, the received packet 160 is linked in service priority buffer 104 in the appropriate virtual FIFO 304. Using such linkages allows packets 160 to be linked together to form virtual FIFO 304 regardless of the physical location at which packets 160 are stored. These preceding steps 404 and 408, illustrate the manner in which packets 160 are buffered in service priority buffer 104 according to one embodiment. The following steps 412–416, describe the manner in which packets are read out of service priority buffer 104 based on the service priority of each packet 160.

In a step 412, packet manager 110 determines the fullness of each virtual FIFO 304 in service priority buffer 104. Additionally, packet manager 110 can determine the total fullness of service priority buffer 104 without regard to individual virtual FIFOs 304. This is illustrated in FIG. 1 by sending total buffer fullness 148 from service priority buffer 104 to service priority manager 112.

In a step 414, service priority manager 112 determines which virtual FIFO 304 to service based on service priority fullness 144 and total buffer fullness 148. This determination is made by looking at the priority of each class and the fullness of each virtual FIFO 304 associated with the classes. If packets 160 are building rapidly in a high-priority service priority, the virtual FIFO 304 associated with that service priority is serviced first. If, on the other hand, a higher priority service priority virtual FIFO 304 has relatively light traffic and traffic is building on a lower priority virtual FIFO 304, service priority manager 112 may decide to take advantage of this opportunity and service the virtual FIFO 304 associated with that lower class.

Thus, the determination is made based primarily on the fullness and priority of each virtual FIFO 304. Once the determination is made, packet manager 110 removes packets from the virtual FIFO 304 that it determined needed servicing in step 414. This removal occurs in a step 416. Packets 160 are removed from the virtual FIFO 304 in the order in which they were stored in that virtual FIFO 304, thus maintaining the original order of transmission.

Steps 212 and 216 can occur continually and simultaneously. Each time packets 160 are input to service class packet processor 100, packets are buffered according to step 212. Packet manager 110 is reading packets out of service priority buffer 104 as long as service priority buffer 104 contains packets 160 to be read. Packet manager 110 can read packets 160 out of service priority buffer 104 at the same time new packets 160 are being stored into service priority buffer 104.

Thus, in accordance with the above-described system and method, and their equivalents, packets 160 can be managed and processed in accordance with a service priority to provide users with the option to specify or request higher priority packet handling. There are numerous methods by which service class packet processor 100 can determine the order in which packets are read out of service priority buffer 104 based on the service priority. A few of these methods are discussed below in Section 4 of this document.

2.2 Loss Priority Processing

As stated above, an additional stage can be added to service packet processor 100 to allow the service class to be further defined by a loss priority in addition to the service priority. Having the ability to further process packets based on a loss priority is important where the input packet rate is such that service priority buffer 104 tends to overflow.

If service priority buffer 104 is full when additional packets 160 are received, these additional packets need to be discarded. Therefore, it is advantageous to determine in advance that service priority buffer 104 is becoming full so that the remaining buffer space can be reserved for packets 160 having a higher loss priority. This is advantageous because if the determination is made after service priority buffer 104 is full, all packets received thereafter are lost, regardless of their priority. However, if this determination is made before service priority buffer 104 fills completely, then the remaining space can be reserved for the higher priority packets.

Figure 5:
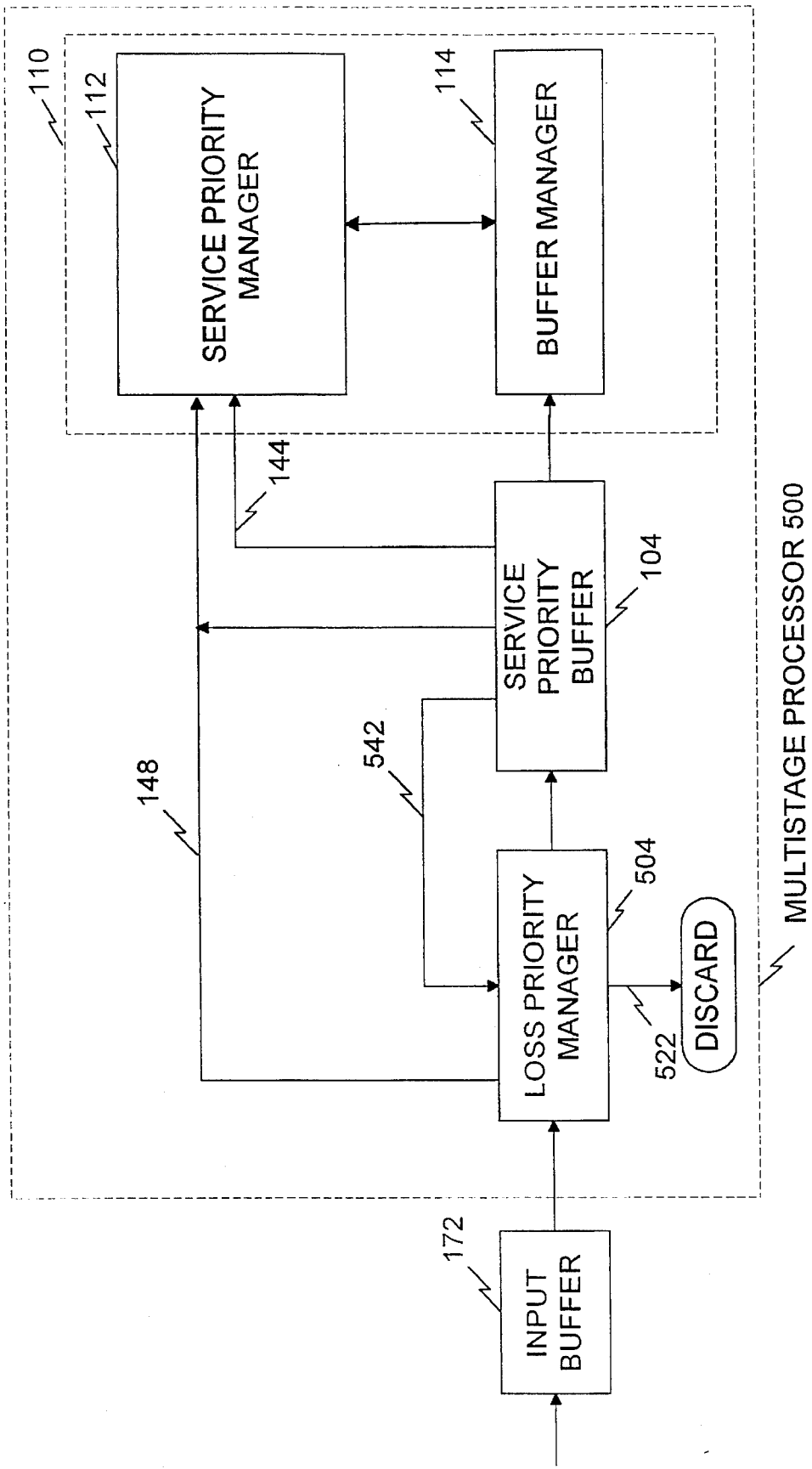
FIG. 5 is a block diagram illustrating a representative functional architecture providing both service priority and loss priority processing.

This additional stage for providing loss priority treatment is now described. FIG. 5 is a block diagram illustrating a representative functional architecture providing both service priority and loss priority processing. Referring now to FIG. 5, multistage processor 500, in this embodiment, includes a loss priority manager as a front end to a service priority packet processor. Loss priority manager 504 determines when fullness of service priority buffer 104 reaches a critical threshold level. At this point, loss priority manager 504 determines which input packets 160 can be stored in the remaining space of service priority buffer 104, and which packets 160 should be discarded (illustrated by arrow 522).

An additional factor used by loss priority manager 504 in determining whether to buffer or discard a packet 160 is a loss priority fullness 542. Loss priority fullness 542 is an indication of the number of packets of each loss priority already stored in buffer 104. For each loss priority, there is a loss priority fullness 542. Thresholds can be established for each loss priority value at different levels. Thus, a high threshold can be established for high priority packets (i.e., packets having a high loss priority), and a low threshold can be established for low priority packets.

Figure 6:
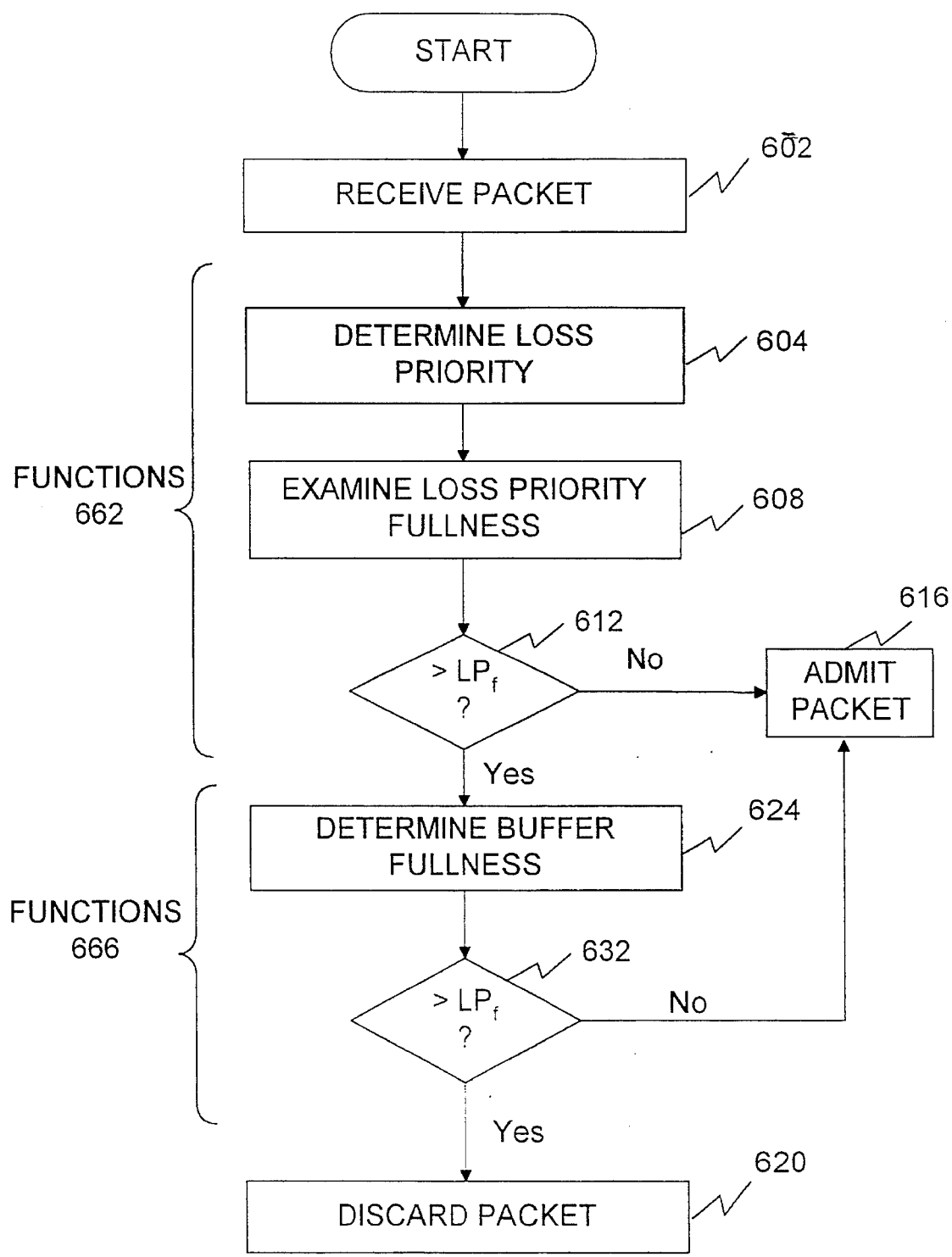
FIG. 6 is an operational flow diagram illustrating a manner in which a loss priority manager determines whether to discard a packet according to its loss priority.

FIG. 6 is an operational flow diagram illustrating the manner in which loss priority manager 504 determines whether to discard a packet 160 according to its loss priority. Referring now to FIGS. 5 and 6, in a step 602, a packet 160 is received by multistage processor 500. In a step 604, loss priority manager 504 determines the loss priority of that packet 160.

Loss priority and/or the service priority of a packet 160 can be encoded into the header 164 of that packet 160. One method by which this can be accomplished is described in detail in Section 3 of this Detailed Description Section.

In a step 608, loss priority manager 504 examines the loss priority fullness 542 of service priority buffer 104 for the loss priority of the packet 160. If the loss priority fullness for that given loss priority of the received packet 160 does not exceed the threshold level established for that loss priority (indicated by decision block 612), that packet 160 is admitted to service priority buffer 104 as indicated by step 616. If, on the other hand, in a step 612 it is determined that the loss priority fullness 542 for that loss priority does exceed the threshold level, processing continues at step a 624.

In step 624, loss priority manager 504 determines the fullness of entire service priority buffer 104 as provided by total buffer fullness 148. If total buffer fullness 148 does not exceed a predetermined threshold (illustrated by decision block 632), the packet is admitted to service priority buffer 104 as indicated by step 616. If, on the other hand, the fullness of service priority buffer 104 exceeds this predetermined threshold, the packet 160 is not admitted to service priority buffer 104 but is instead discarded in a step 620.

The threshold is established such that if a particular loss priority in service priority buffer 104 is too full, a packet of that loss priority can still be admitted if there is sufficient room in the buffer so that overflow problems are not anticipated. The threshold is set such that loss priority manager 504 makes decisions on whether to discard a packet based on the loss priority well before the fullness of service priority buffer 104 dictates that all packets need to be discarded regardless of their priority.

The method of this embodiment was described as determining whether loss priority fullness exceeded a threshold (indicated by group of functions 662) prior to determining whether the total buffer fullness exceeded a threshold (indicated by group of functions 666). As would be apparent to a person skilled in the relevant art, loss priority manager 504 could alternatively perform only functions 666 or only functions 662 to determine whether to discard a packet 160. If both functions 662 and 666 are performed, a better determination can be made as to whether to discard a packet 160. However, per/brining both functions 662 and 666 requires additional processor time.

3. Assignment of Loss and Service Priorities

The above-described services provide flexible means for controlling selective packet discarding and for minimizing packet delays through the use of multiple service priority and loss priorities. Implementation of this "service class" type of packet treatment is optimal when it is accomplished without increasing the switch traffic and still maintaining conformance with the applicable packet transmission standards.

One embodiment for implementing service class for packet data is now described. This implementation is described in terms of packet data conforming to ATM standards. It would be apparent to a person skilled in the relevant art how the service class could be implemented using alternative packet data standards.

According to this embodiment, when a packet is received, its header error code (HEC) is checked to determine whether any errors occurred during transmission. Also upon receipt of a packet, its VP virtual packet and VC virtual channel fields are used to look up a specific service priority and loss priority for that packet (i.e., the service class for the packet). Because the HEC field is no longer needed, it is replaced by the service class. As a result, no extra bits, and therefore no increased bandwidth, are needed to provide service class packet treatment.

Figure 7:
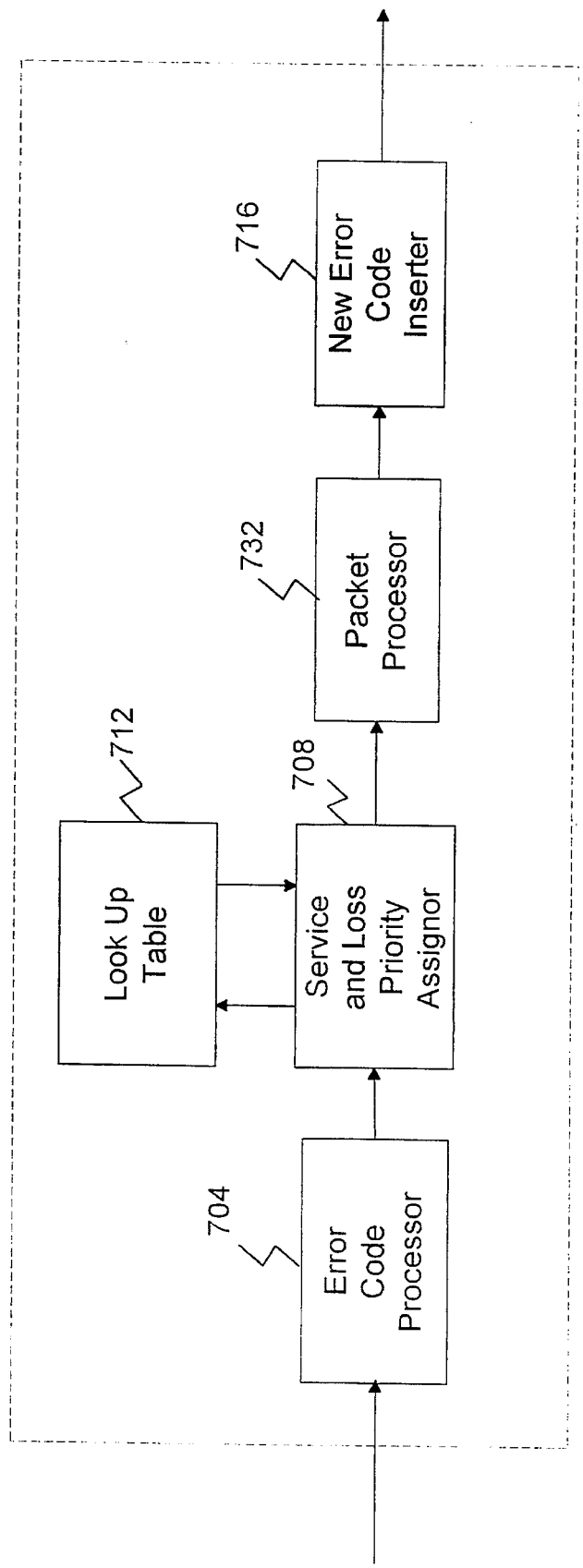
FIG. 7 is a block diagram illustrating a representative functional architecture for implementing service class for packet processing.

FIG. 7 is a block diagram illustrating a representative functional architecture for implementing service class for packet processing. Referring now to FIG. 7, the representative architecture includes error code of processor 704, service priority and loss priority assignor 708, lookup table 712, and new error code inserter 716.

Also illustrated in FIG. 7, is a packet processor 732. Packet processor performs the processing that takes place once the service class is assigned to the packet. Examples of packet processor 732 include service class packet processor 100 (illustrated in FIG. 1) or multistage packet processor 500 (illustrated in FIG. 5).

Figure 8:
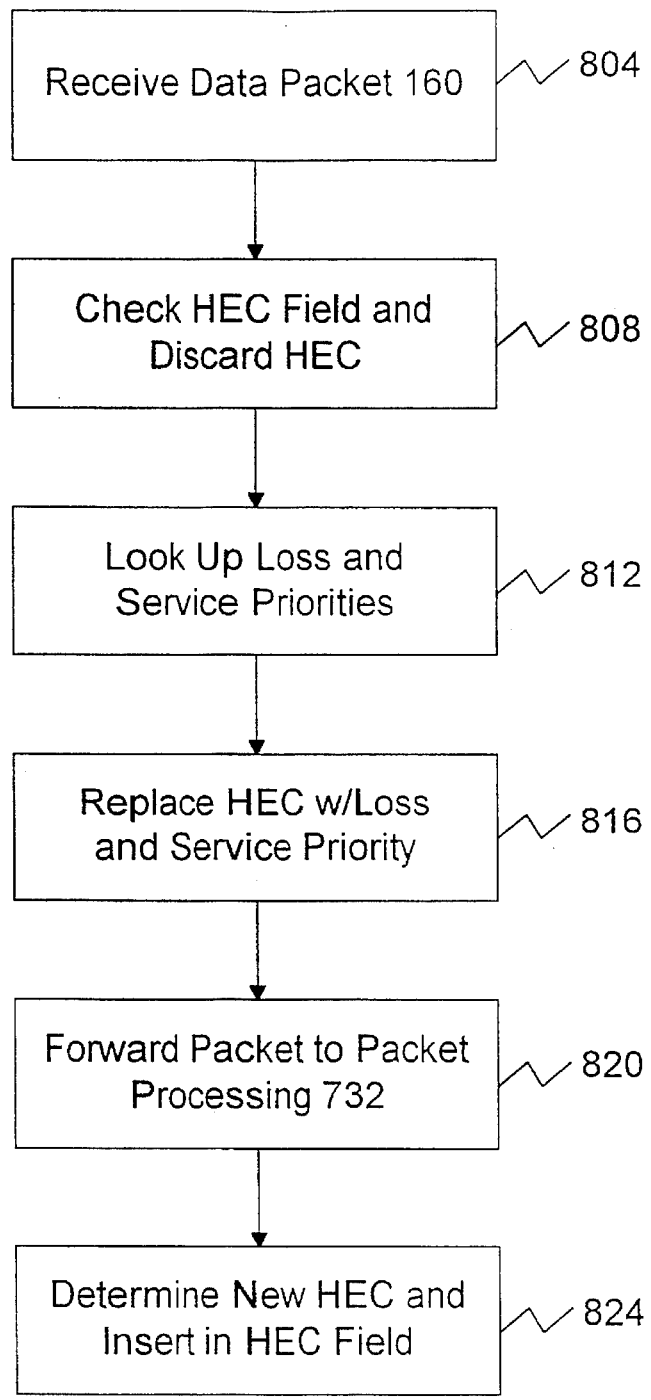
FIG. 8 is an operational flow diagram illustrating the manner in which service class is implemented according to one embodiment of the invention.

FIG. 8 is an operational flow diagram illustrating the manner in which service class features are implemented according to one embodiment of the invention. Referring now to FIGS. 7 and 8, this embodiment is now described. In a step 804, a data packet is received from a packet switch network. In the example described herein, this packet is an ATM packet having an HEC field in its header and also having VC and VP fields in its header as well.

In a step 808, the HEC field is checked and discarded. This occurs in error code processing 704. After this step, the HEC field usually becomes invalid because either routing the packet for the next hop changes the VP and/or VC in the header and/or admission control changes the CLP bit value. A new HEC value could be calculated at this point and inserted in the HEC field. Instead, the HEC value is discarded to allow the HEC field to be used for the service class designation.

In a step 812, service and loss priority assignor 708 uses the VP and VC fields of the packet to perform a table lookup of the service class to be assigned to that packet. This lookup is accomplished using table 712.

In a step 816, service and loss priority assignor 708 replaces the HEC field with the loss priority and service priority assigned to the packet in accordance with its service class as determined in step 812. In a step 820, the packet is forwarded to packet processor 732. Packet processor 732 works at a rate considerably higher than that of the incoming link. Therefore, according to the invention, service class parameters are determined and inserted at the lower ingress rate, before the packet gets to packet processor 732.

In a step 824, at the egress link, a new HEC value is determined and inserted in the HEC field of the ATM packet by new error code inserter 716.

Figure 9:
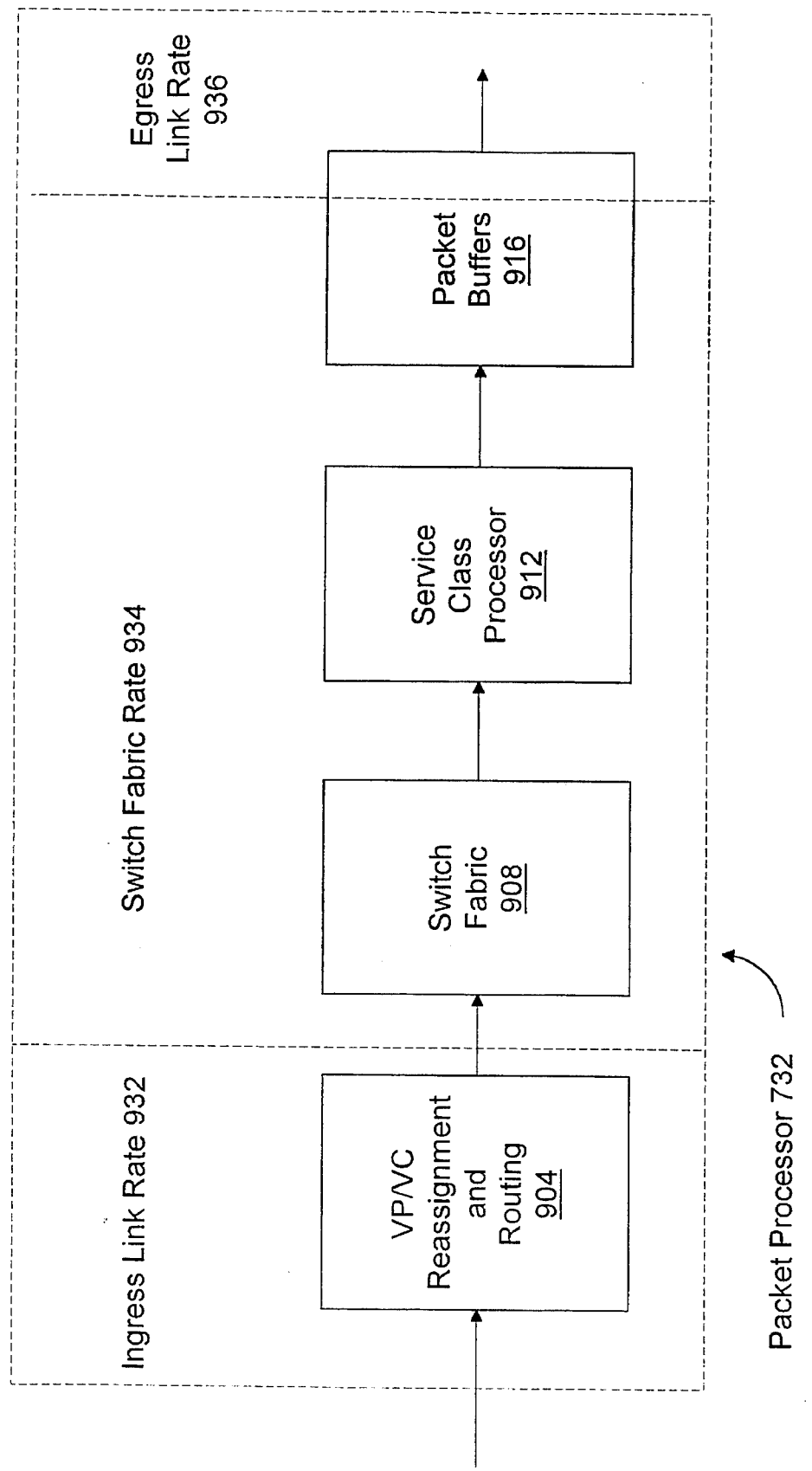
FIG. 9 is a block diagram illustrating an example implementation of packet processing.

FIG. 9 is a block diagram illustrating the different rates at which packet data are handled by packet processor 732: ingress link rate 932, switch fabric rate 934, and egress link rate 936. Referring now to FIGS. 7, 8, and 9, as discussed above, in steps 812 and 816, service and loss priority assignor 708 determines a service class for the data packet 160, inserts the service class in the HEC field, and forwards data packet 162 packet processor 732. All of this is performed at the ingress link rate 932. Upon receipt of a data packet 160, packet processor 732 performs virtual path/ virtual channel reassignment and routing as indicated by box 904. This VP/VC reassignment and routing is performed at the ingress link rate 932.

Data packet 160 is forwarded to switch fabric 908. Because more than one ingress port can have data for switch fabric 908 and the same egress port, data packets 160 may enter switch fabric 908 in bursts at rates equal to the switch fabric bandwidth. As a result, switch fabric rate 934 is typically much higher than ingress link rate 932 and therefore, processing time in switch fabric 908 is at a premium. Therefore, having the service class parameters already determined for the data packet eliminates the need of a table lookup at the switch fabric rate 934, and therefore permits more sophisticated service class processing to be performed in service class processor 912 (e.g., service class processor 100). Once service class processing is completed, data packet 160 is buffered in packet buffer 916 and exits packet processor 732 at the egress link rate 936. Egress link rate 936 is typically much lower than switch fabric rate 934.

4. Service Priority Management

As noted above, there are several methods by which the flow of packets can be controlled in packet processor 732. More particularly, service class processor 912 can use several different methods for determining a specific virtual queue 304 from which data is to be read. A few of these methods are described in this section in greater detail.

4.1 High Priority First Served Traffic

Figure 10:
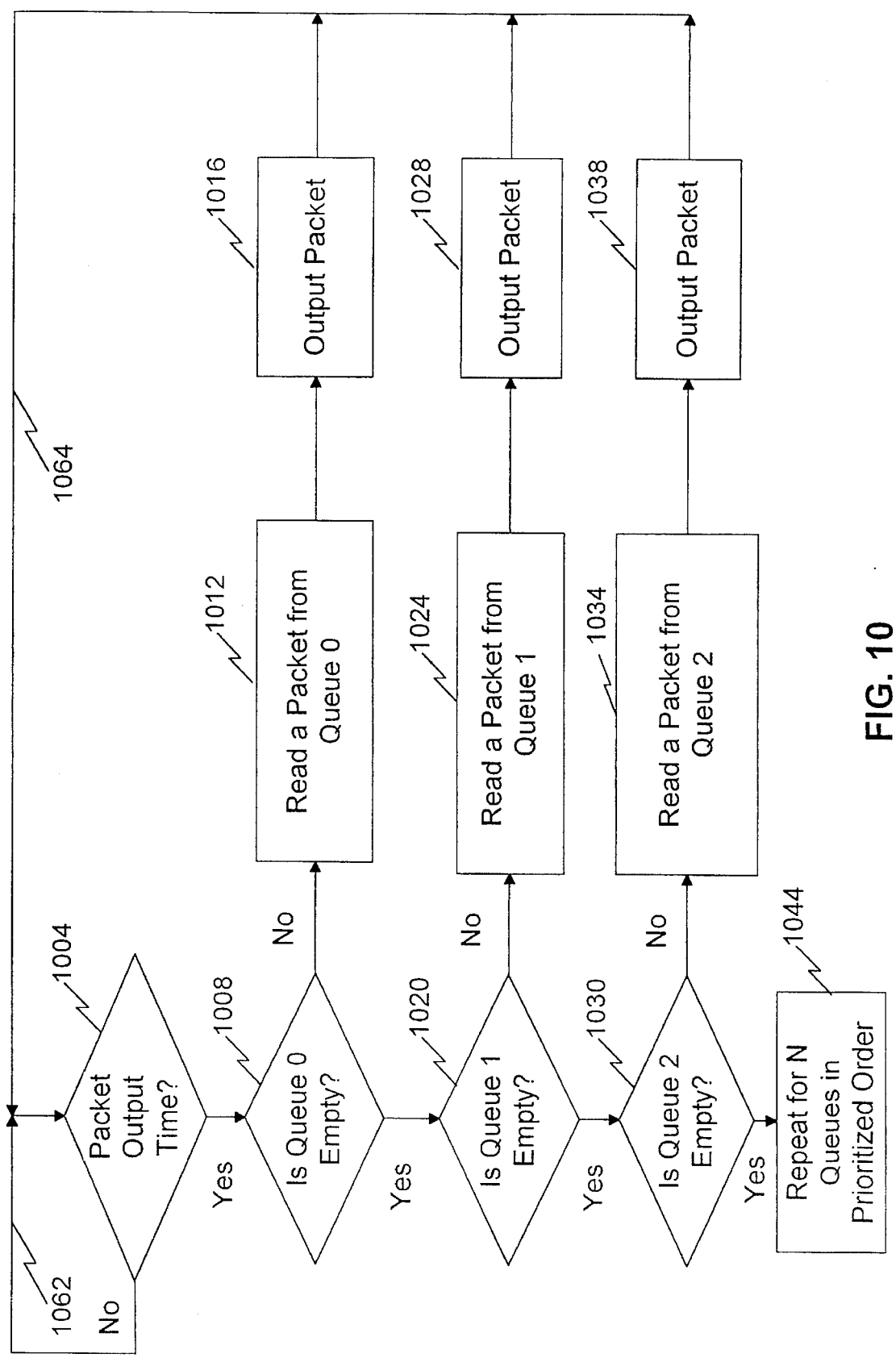
FIG. 10 is a flow diagram illustrating the high priority first served traffic method.

One method by which packets can be read from service priority buffer 104 is the high priority first served (HPFS) traffic method. FIG. 10 is a flow chart illustrating the HPFS traffic method. Referring now to FIG. 10, this method is now described. In a step 1004, service class processor 912 determines whether it is time to output a packet. If a packet is to be output, service class processor 912 continues at a step 1008. If it is not time to output a packet, no packets 160 are output as is illustrated by flow line 1062.

In a step 1008, service class processor 912 first determines whether there are any packets 160 in virtual queue zero (e.g., virtual FIFO 304A). If there are data packets 160 in queue zero, in a step 1012, one or more of these packets 160 are read from queue zero. The packet(s) read are output to the network in a step 1016. Packet processor 912 then waits for the next output time as illustrated by flow line 1064.

If, on the other hand, in step 1008 it is determined that queue zero is empty, packet processor 912 examines the status of the next highest priority queue, queue 1, (e.g., virtual FIFO 304B). If there are data packets 160, in queue 1, in a step 1024, service class processor 912 reads one or more of these packets 160 from queue 1 and outputs them to the network in a step 1028. Once this is accomplished, packet processor waits until the next packet output time as illustrated by flow line 1064.

If in step 1020, packet processor 912 determines that queue 1 was empty, packet processor 912 examines queue 2 (e.g., virtual FIFO 304C) in a step 1030. If there are data packets 160 in queue 2, one or more of these packets 160 are read from queue 2 and output to cell 1038. Once this is done, service class processor 912 waits for the next output packet time as indicated by feedback loop 1064.

If in step 1030 service class processor 912 determines that queue 2 was also empty, it would go to the next-highest priority queue. This is repeated for N queues in order of the priority established for the queues. Thus, according to the HPFS traffic method, service class processor 912 searches the queues in order of priority and reads packets 160 from the first queue that is found to contain one or more data packets 160.

4.2 Weighted Round Robin Readout Scheme

In the weighted round robin readout scheme, each queue (i.e., each FIFO 304A–304N) is assigned a weight based on that queue's priority. The higher the queue priority, the greater is the weight assigned to that queue. Servicing of the queues is accomplished based on their assigned weights, and thus based on their relative priorities.

Figure 11:
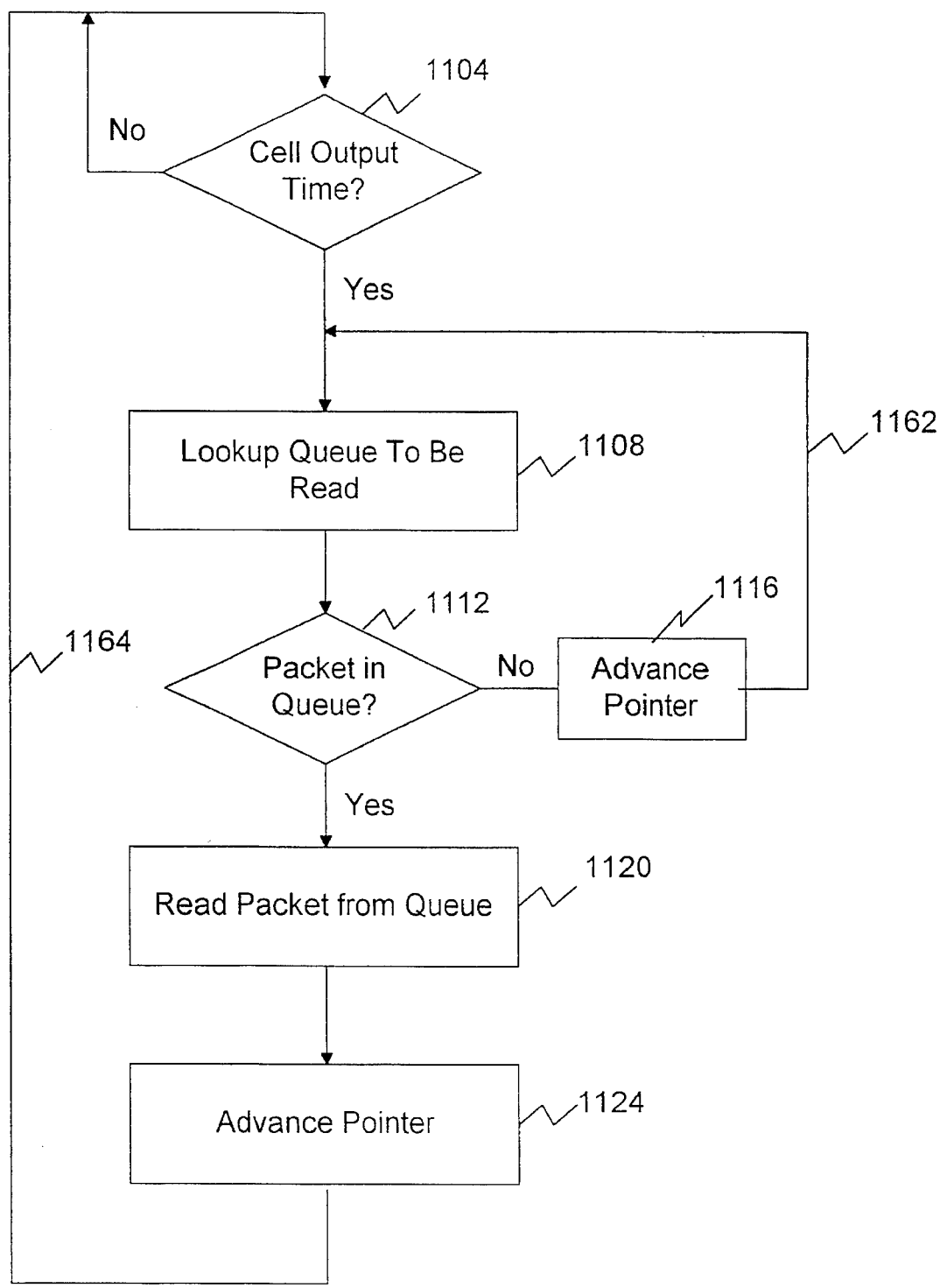
FIG. 11 is a flowchart illustrating a method by which a weighted round robin readout scheme can be implemented.

FIG. 11 is a flow chart illustrating a method by which a weighted round robin readout scheme can be implemented. This method is described in conjunction with a simple example. In this simple example, there are three queues, queue 1, queue 2, and queue 3 (e.g., Virtual FIFOs 304A, 304B, and 304C). Queue 1, the highest priority queue is given a weight of four. Queue 2, the next lowest priority queue, is given a weight of two. Queue 3, the lowest priority, is given a weight of one. According to this scheme, queue 1, the highest priority queue, is serviced four times a much as queue 3, and twice as much as queue 2. The actual weights assigned to the queues can be chosen to implement weighting desired for a given application. Also, the number of queues implemented is chosen to suit the application.

Figure 12:
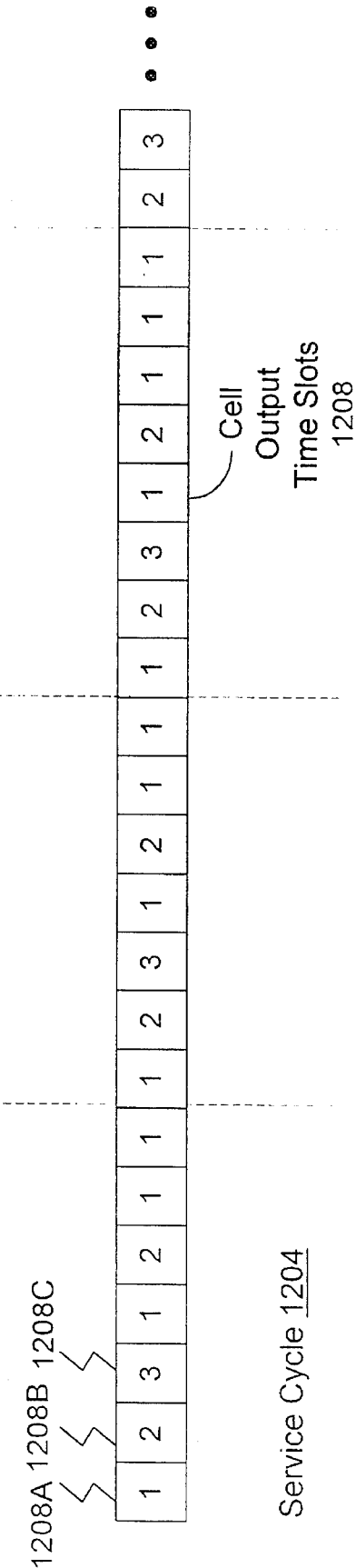
FIG. 12 is a diagram illustrating an example implementation of the weighted round robin readout scheme.

FIG. 12 is a diagram illustrating one scheme by which packets can be output from queues 1, 2, and 3 in this example. Referring now to FIG. 12, in the weighted round robin readout scheme, the readout process is divided into service cycles 1204, and each service cycle 1204 has a number of output time slots 1208. In each service cycle 1204, packets 160 are read from each queue in accordance with the weight assigned to that queue. For example, in a service cycle 1204, data is read from queue 1 four times, from queue 2 two times, and from queue 3 once. This service cycle 1204 is repeated as long as data is being read from service priority buffer 104. As FIG. 12 indicates, there are more output time slots 1208 for queue 1 than there are for queues 2 and 3. Therefore, queue 1 is serviced more frequently, and thus has a higher rate of output than queues 2 and 3.

Referring now to FIG. 11, the weighted round robin readout scheme is described. When it is time for service class processor 912 to output a cell as indicated by decision block 1104, service class processor 912 determines which queue is to be read in a step 1108. In one embodiment, this determination is made by referring to a cell output table containing service cycle 1204. A pointer in the table is used to indicated which cell output time slot 1208 is current. The queue indicated by the pointer is the queue to be serviced.

In a step 1112, service class processor 912 determines if there is data in the queue pointed to by the pointer. If not, in a step 1116, the pointer is advanced and the next queue to be serviced is read. This is indicated by feedback loop 1162. If, on the other hand, there is data in the queue pointed to by the pointer, in a step 1120, one or more packets 160 are read from that queue.

In a step 1124, once the read is completed, the pointer is advanced to the next output time slot. The operation then continues at step 1104 as illustrated by flow line 1164.

Thus, in accordance with the above example, at the first cell output time the pointer points to the output time slot 1208A. If there is a packet in queue 1 at this time, this packet is read and the pointer is advanced to cell output time slot 1208B. At the next cell output time, if there is data in queue 2, this data is read and the pointer advanced to cell output time slot 1208C. This operation continues for each cell output time. As discussed above, if no data is in the queue indicated by the current cell output time slot 1208, the pointer is advanced and the queue indicated by the next time slot 1208 is examined.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for implementing service class features in a packet switch, comprising the steps of:

(a) receiving a data packet having a header;

(b) checking an error code in an error code field of said packet header to determine if data errors occurred during transmission;

(c) determining service class parameters based on information contained in said packet header; and (d) inserting said service class parameters in said error code field.

2. The method of claim 1 further comprising a step, after said step (d), of forwarding said data packet with said service class parameters to said packet switch.

3. The method of claim 2 further comprising the step of computing a new error code and inserting it in said error code field after said data packet passes through the packet switch.

4. The method of claim 1, wherein said step (c) of determining said service class parameters comprises the steps of determining a service priority and a loss priority for said data packet.

5. The method of claim 4, further comprising the steps of:

(e) storing said data packet in a virtual queue of a service priority buffer based on said service priority parameter; and (f) reading packets out of said service priority buffer using a high priority first served traffic method.

6. The method of claim 4, further comprising the steps of:

(e) storing said data packet in a virtual queue of a service priority buffer based on said service priority parameter; and (f) reading packets out of said service priority buffer using a weighted round robin readout scheme.

7. The method of claim 1, wherein said step (c) of determining said service class parameters comprises the step of performing a table look-up using data contained in said packet header.

8. The method of claim 7, wherein said step (c) comprises the steps of looking up a service priority parameter and a loss priority parameter in a look-up table based on data contained in said packet header.

9. The method of claim 7, wherein said step (c) comprises the steps of looking up a service priority parameter and a loss priority parameter in a look-up table based on a user identification code contained in said packet header.

10. The method of claim 7, wherein said step (c) comprises the steps of looking up a service priority parameter and a loss priority parameter in a look-up table based on a source identification code contained in said packet header.

11. A system for implementing service class features in a packet switch, comprising:

(a) means for checking an error code in an error code field of a header of a packet to determine if data errors occurred during transmission of the packet;

(b) means for determining service class parameters based on information contained in said packet header; and (c) means for inserting said service class parameters in said error code field.

12. The system of claim 11, further comprising means for receiving a data packet having a header.

13. The system of claim 11, further comprising means for forwarding said data packet with said service class parameters to the packet switch.

14. The system of claim 13 further comprising means for computing a new error code and inserting it in said error code field after said data packet passes through the packet switch.

15. The system of claim 11, wherein said means for determining said service class parameters comprises means for determining a service priority and a loss priority for said data packet.

16. The system of claim 11, wherein said means for determining said service class parameters comprises:

table means for storing said service class parameters; and means for retrieving said service class parameters from said table means using data contained in said packet header.

17. The system of claim 16, wherein said table means stores a service priority parameter and a loss priority parameter.

18. The system of claim 16, wherein said means for retrieving said service class paramaters comprises means for retrieving a service priority parameter and a loss priority parameter from said table means based on a user identification code contained in said packet header.

19. The system of claim 16, wherein said means for retrieving said service class paramaters comprises means for retrieving a service priority parameter and a loss priority parameter from said table means based on a source identification code contained in said packet header.

20. A method of implementing service class features in a packet switch, comprising the steps of:

(a) determining service class parameters based on information contained in a header of a received packet; and (b) inserting said service class parameters in a temporarily unused error code field in said header of said received packet header before said received packet is sent through a switch fabric.

21. A system for implementing service class features in a packet switch, comprising:

(a) means for determining service class parameters based on information contained in a header of a received packet; and (b) means for inserting said service class parameters in a temporarily unused error code field in said header of said received packet header before said received packet is sent through a switch fabric.

* * * * *